(12) United States Patent
Nemesh et al.

(10) Patent No.: US 8,950,533 B2
(45) Date of Patent: Feb. 10, 2015

(54) COOLING ARRANGEMENT FOR A COMPONENT IN A VEHICLE

(75) Inventors: Mark D. Nemesh, Troy, MI (US); Wissam Ibri, Sterling Heights, MI (US)

(73) Assignee: GM Global Technology Operations LLC, Detroit, MI (US)

(*) Notice: Subject to any disclaimer, the term of this patent is extended or adjusted under 35 U.S.C. 154(b) by 503 days.

(21) Appl. No.: 13/017,994

(22) Filed: Jan. 31, 2011

(65) Prior Publication Data
US 2012/0193068 A1 Aug. 2, 2012

(51) Int. Cl.
*B60K 11/06* (2006.01)
*B60L 11/18* (2006.01)
(Continued)

(52) U.S. Cl.
CPC ............ *B60L 11/1812* (2013.01); *B60K 11/06* (2013.01); *B60K 2001/005* (2013.01); *H01M 10/5016* (2013.01); *Y02T 10/7005* (2013.01); *Y02T 90/16* (2013.01); *H01M 2220/20* (2013.01);
(Continued)

(58) Field of Classification Search
CPC ............ H01M 10/50; H01M 10/5004; H01M 10/5016; H01M 10/5067; B60L 11/1809; B60L 11/1816; B60L 11/1818; B60K 11/06; Y02T 90/12; Y02T 90/14; Y02T 90/121; B60H 1/00564; F01P 1/00; F01P 1/06; F01P 5/00; F01P 5/02; F01P 5/06
USPC ............ 180/65.1, 65.21, 68.1, 68.2; 454/275, 454/69, 75, 103, 105, 107–109, 111, 112, 454/145, 149, 152, 155; 296/208; 165/41, 165/72; 320/107, 109, 111, 112, 150; 123/41.66; 439/3, 190, 191, 198, 206
See application file for complete search history.

(56) References Cited

U.S. PATENT DOCUMENTS 5,577,747 A * 11/1996 Ogawa et al. .................. 180/220
5,647,450 A * 7/1997 Ogawa et al. .................. 180/220
(Continued)

FOREIGN PATENT DOCUMENTS

CN 101934724 A 1/2011
JP 08037705 A * 2/1996 .............. B60L 11/18
(Continued)

OTHER PUBLICATIONS

State Intellectual Property Office of the Peoples' Republic of China, Office Action for Chinese Patent Application No. 201210021499.5, mailed Feb. 8, 2014.

*Primary Examiner* — J. Allen Shriver, II
*Assistant Examiner* — Steve Clemmons
(74) *Attorney, Agent, or Firm* — Ingrassia Fisher & Lorenz, P.C.

(57) ABSTRACT

A cooling arrangement is disclosed for a vehicle having a first component, a first duct, and a cooling fan configured to deliver air through the first duct to the first component when the cooling fan is operated. The cooling arrangement includes, but is not limited to, a second component, a port coupled to the second component, the port being accessible from a position external to the vehicle, and a second duct having a first end positioned proximate the port and a second end in fluid communication with the first duct. The second duct is configured to deliver air from outside of the vehicle to the second component when the cooling fan is operated while the vehicle is off.

17 Claims, 5 Drawing Sheets

(51) Int. Cl.
*B60K 1/00* (2006.01)
*H01M 10/625* (2014.01)

(52) U.S. Cl.
CPC .............. *Y02T10/7088* (2013.01); *Y02T 90/14* (2013.01); *Y02T 90/127* (2013.01)
USPC ..... 180/68.1; 180/68.2; 180/65.1; 180/65.21; 165/72; 320/112; 320/150; 439/3; 454/145

(56) References Cited

U.S. PATENT DOCUMENTS

| | | | |
|---|---|---|---|
| 6,457,542 B1* | 10/2002 | Hosono et al. | 180/68.1 |
| 6,624,615 B1* | 9/2003 | Park | 320/150 |
| 7,152,417 B2* | 12/2006 | Morishita et al. | 62/186 |
| 2004/0100225 A1* | 5/2004 | Neil et al. | 320/109 |
| 2006/0075766 A1* | 4/2006 | Ziehr et al. | 62/186 |
| 2007/0238015 A1* | 10/2007 | Kubota et al. | 429/120 |
| 2008/0236181 A1* | 10/2008 | Zhu et al. | 62/239 |
| 2009/0071178 A1* | 3/2009 | Major et al. | 62/239 |
| 2009/0256523 A1* | 10/2009 | Taguchi | 320/109 |
| 2009/0257190 A1* | 10/2009 | Yoda | 361/690 |
| 2009/0260905 A1* | 10/2009 | Shinmura | 180/68.1 |
| 2010/0106351 A1* | 4/2010 | Hanssen et al. | 701/22 |
| 2010/0156355 A1* | 6/2010 | Bauerle et al. | 320/145 |
| 2010/0276220 A1* | 11/2010 | Kubota et al. | 180/68.1 |
| 2010/0294580 A1* | 11/2010 | Kubota et al. | 180/68.1 |
| 2011/0298241 A1* | 12/2011 | Varns et al. | 296/64 |

FOREIGN PATENT DOCUMENTS

| | | | | |
|---|---|---|---|---|
| JP | 10223263 A | * | 8/1998 | H01M 10/50 |
| JP | 2000115915 A | * | 4/2000 | B60L 11/18 |
| JP | 2005318675 A | * | 11/2005 | B60L 3/00 |
| JP | 2008052997 A | * | 3/2008 | |

* cited by examiner

COOLING ARRANGEMENT FOR A COMPONENT IN A VEHICLE

TECHNICAL FIELD

The technical field generally relates to vehicles, and more particularly relates to a cooling arrangement for a component in a vehicle.

BACKGROUND

Certain vehicles, including, but not limited to, extended range electric vehicles, are configured to be plugged into an electric power source, to store power in a rechargeable energy storage system (e.g., a high voltage battery), and to convert that stored power into torque to drive the vehicle's wheels. One electrical power source that may be used to feed the rechargeable energy storage system is a standard residential electrical outlet, which provides either 110 Volts or 220 Volts of alternating current electricity. Rechargeable energy storage systems, however, are commonly configured to store direct current electricity. To accommodate this, the vehicle may also include an onboard charging module which is configured to receive the alternating current from the standard residential electrical outlet and to convert that alternating current to direct current for storage.

As the onboard charging module converts the alternating current to direct current, it has a tendency to heat up. In the past, a liquid coolant that was used to cool other components on the vehicle was routed to the onboard charging module to offset the build up of heat. This solution works well in circumstances where the onboard charging module is located relatively close to the other components that are being cooled. However, when the onboard charging module is located remotely from such other components, as is sometimes dictated by design considerations, the sharing of liquid coolant with the other components as a means for controlling the temperature of the onboard charging module may entail unacceptable complications. For example, the use of liquid coolant in such circumstances may require additional conduit to carry the coolant between the remotely located components. It may also require additional coolant to fill the additional conduit as well as an additional pump to maintain an appropriate level of pressure to move the additional coolant through the conduit. Such a solution may also complicate the packaging of other components on the vehicle in order to accommodate the additional conduit and pump. Thus, while the continued sharing of liquid coolant between the onboard charging module and remotely located components is adequate to control the temperature of the onboard charging module, there is room for improvement.

SUMMARY

A cooling arrangement for a vehicle is disclosed herein. The vehicle has a first component, a first duct, and a cooling fan that is configured to deliver air through the first duct to the first component when the cooling fan is operated.

In a first embodiment, the cooling arrangement includes, but is not limited to, a second component, a port coupled to the second component, the port being accessible from a position external to the vehicle, and a second duct having a first end positioned proximate the port and a second end in fluid communication with the first duct. The second duct is configured to deliver air from outside of the vehicle to the second component when the cooling fan is operated while the vehicle is off.

In a second embodiment, the cooling arrangement includes, but is not limited to, a second component, a port coupled to the second component, the port being accessible from a position external to the vehicle, and a second duct having a first end positioned proximate the port and a second end in fluid communication with the first duct. The second duct is configured to deliver air from outside of the vehicle to the second component when the cooling fan is operated while the vehicle is off. The first component and the second component are fluidly coupled to one another in a series arrangement.

In a third embodiment, the cooling arrangement includes, but is not limited to, a second component, a port coupled to the second component, the port being accessible from a position external to the vehicle, and a second duct having a first end positioned proximate the port and a second end in fluid communication with the first duct. The second duct is configured to deliver air from outside of the vehicle to the second component when the cooling fan is operated while the vehicle is off. The first component and the second component are fluidly coupled to one another in a parallel arrangement.

DESCRIPTION OF THE DRAWINGS

One or more embodiments will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any expressed or implied theory presented in the preceding technical field, background, brief summary or the following detailed description.

An improved cooling arrangement for a component of a vehicle is disclosed herein. The component is cooled by using a duct to route air from an area outside of the vehicle to the component by joining the duct to existing duct work and by using an existing fan, both of which are already in place and are being used to cool a different component of the vehicle. By drawing air from outside of the vehicle, the component can be soaked in a relatively cool fluid (ambient air) without the need to modify the vehicle's existing liquid cooling system, and thus avoids the need to attach lengthy lines of conduit to the vehicle, additional liquid coolant, and an additional liquid pump. By using existing duct work and an existing fan to draw in and direct outside air to the component, the expense associated with designing, fabricating, and assembling an independent cooling system can be avoided.

A further understanding of the cooling arrangement for component in a vehicle described above may be obtained through a review of the illustrations accompanying this application together with a review of the detailed description that follows.

Figure 1:
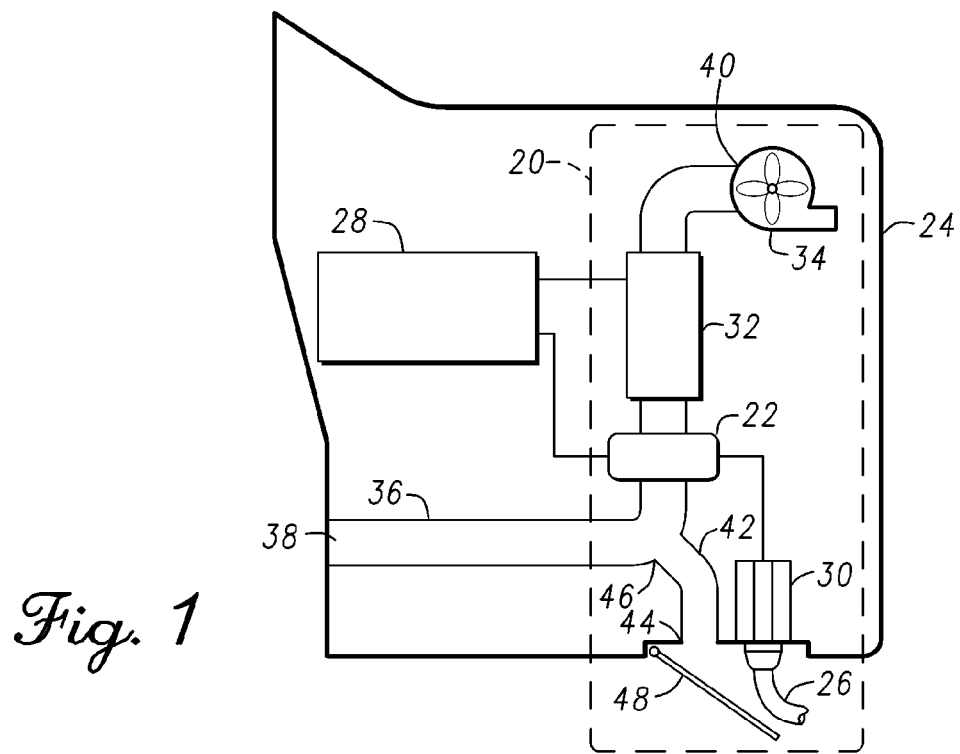
FIG. 1 is a schematic view illustrating an embodiment of a cooling arrangement in a first configuration.

FIG. 1 is a schematic view illustrating an embodiment of a cooling arrangement 20 for an onboard charging module 22 of vehicle 24 which, in the illustrated embodiment, is an extended range electric vehicle. Although vehicle 24 is illustrated here as being an extended range electric vehicle, it should be understood that vehicle 24 may be any type of vehicle including, but not limited to, a hybrid electric vehicle, a battery electric vehicle, or a conventional internal combustion engine powered vehicle. Additionally, although the illustrated embodiments depict an onboard charging module as the component that is cooled by cooling arrangement 20, it should be understood that cooling arrangement 20 may be used to cool any desired vehicle component.

Onboard charging module 22 is configured to receive alternating current electricity from an electric charger 26 (e.g., an electric plug) and then convert that alternating current electricity to direct current electricity for storage in a rechargeable energy storage system 28. In the illustrated embodiment, rechargeable energy storage system 28 may comprise a high-voltage battery. Electric charger 26 may deliver alternating current electricity to onboard charging module 22 from an electrical outlet such as a standard 110 V or 220 V residential electric outlet. The charging system for vehicle 24 further includes a port 30 which is configured to receive electric charger 26 and to route the alternating current electricity from electric charger 26 to onboard charging module 22.

The charging system of vehicle 24 is configured to receive and store electric power in rechargeable energy storage system 28 during periods of time when vehicle 24 is switched off. In a typical use case, an operator of vehicle 24 will complete his or her daily travels, turn vehicle 24 off and park vehicle 24 overnight. During this overnight period, the vehicle operator will attach electric charger 26 to port 30 and the charging system will charge throughout the night. As onboard charging module 22 converts the alternating current electricity to direct current electricity, onboard charging module 22 has a tendency to heat up. Therefore, it is during such recharging periods that onboard charging module 22 requires cooling.

Vehicle 24 further includes an auxiliary power module 32. Auxiliary power module 32 is configured to receive high-voltage direct current electricity from rechargeable energy storage system 28 while vehicle 24 is turned on and to convert such high-voltage direct current electricity to low voltage direct current electricity (e.g., 12 V). In this manner, auxiliary power module 32 is configured to provide electric power to various accessories onboard vehicle 24 during vehicle operations.

Auxiliary power module 32 has a tendency to heat up as it converts high-voltage electricity to low voltage electricity. An auxiliary power module blower 34 and a duct 36 are provided to cool auxiliary power module 32 as it operates. Duct 36 has a first end 38 that is positioned to receive air from a passenger compartment of vehicle 24 and a second end 40 that is attached to auxiliary power module blower 34. When vehicle 24 is on and auxiliary power module 32 is being operated, auxiliary power module blower 34 will draw air from the cabin of vehicle 24 into first end 38 of duct 36. The cabin air will flow through duct 36 and cool auxiliary power module 32 before being exhausted through second end 40 and out through auxiliary power module blower 34. Because auxiliary power module 32 requires cooling only when vehicle 24 is being operated, it is anticipated that the climate control system onboard vehicle 24 will maintain the air in the passenger compartment at a temperature that will be sufficiently low to effectively cool auxiliary power module 32 or that the vehicle occupant(s) has positioned the windows of the vehicle in the down position in order to prevent the air temperature inside the passenger compartment from becoming too hot.

As illustrated in FIG. 1, cooling arrangement 20 positions onboard charging module 22 in the path of duct 36. Onboard charging module 22 has been arranged in series (i.e., sequentially) with auxiliary power module 32. In the illustrated embodiment, onboard charging module 22 has been positioned upstream with respect to auxiliary power module 32. In other embodiments, the relative positioning of these two components could be reversed without departing from the teachings herein. Arranged in this manner, air flowing through duct 36 and passing over/through auxiliary power module 32 will also pass over/through onboard charging module 22. However, cooling arrangement 20 does not rely on air from the passenger compartment of vehicle 24 to cool onboard charging module 22. The temperature of the air inside of the passenger compartment may not be sufficiently low during periods when onboard charging module 22 requires cooling to adequately cool onboard charging module 22 because onboard charging module 22 requires cooling only during periods when vehicle 24 is switched off. When vehicle 24 is switched off, the climate control system of vehicle 24 does not cool the air in the passenger compartment. The absence of cooled air in the passenger compartment could be a concern when vehicle 24 is located in warmer climates, during summer months, and/or when vehicle 24 is parked in direct sunlight. Under such conditions, the air in the passenger compartment can quickly heat up to temperatures above the ambient temperature outside of vehicle 24 and above the temperature necessary to adequately cool onboard charging module 22.

Accordingly, cooling arrangement 20 includes a duct 42 which is configured to deliver air from outside of vehicle 24 to onboard charging module 22. A first end 44 of duct 42 is located at a periphery of vehicle 24 and is positioned to access the ambient air. A second end 46 of duct 42 is in fluid communication with duct 36 (i.e., fluids such as air can move freely between duct 42 and duct 36). Arranged in this manner, auxiliary power module blower 34 can be used to draw air into duct 42 from outside of vehicle 24 to cool onboard charging module 22. This arrangement avoids the need to provide an independent cooling fan for onboard charging module 22 because onboard charging module 22 and auxiliary power module 32 share auxiliary power module blower 34. These two components can share a single cooling fan without either component suffering any diminution in cooling efficiency because these two components do not require cooling at the same time. Rather, auxiliary power module 32 will require cooling only when vehicle 24 is switched on and onboard charging module 22 will require cooling only when vehicle 24 is switched off.

Cooling arrangement 20 may further include a cover member 48 that is configured to move between an open position and a closed position. When cover member 48 is in the closed position, cover member 48 conceals second end 40 and port 30. When cover member 48 is in the open position, second end 40 and port 30 are accessible from a position external to vehicle 24 and second end 40 is able to draw ambient air into duct 42.

Configured in this manner, when an operator is recharging vehicle 24, cover member 48 will be open and auxiliary power module blower 34 can draw ambient air from outside of vehicle 24 in through first end 44 of duct 42. That ambient air will travel through duct 42 and then vent into duct 36 through second end 46. From there, the cool ambient air will be drawn over/through onboard charging module 22 by auxiliary power module blower 34 and will cool onboard charging module 22. When vehicle 24 is being operated, cover member 48 will closed. This will prevent air passing through duct 36 from being diverted into duct 42 and then out of vehicle 24. This will also prevent undesired media (dust, water, etc) from being drawn into the vehicle by Blower 34 while the vehicle is moving. During vehicle operation, closed cover 48 also prevents noise from entering the vehicle via duct 42.

Vehicle 24 may include a central processing unit or other similar processing device (not shown) that may be configured to detect when electric charger 26 is engaged with port 30 or may otherwise be configured to detect when rechargeable energy storage system 28 is storing electric power while vehicle 24 is turned off. Upon detecting such condition, such processing device may be further configured to actuate auxiliary power module blower 34 to cause it to draw ambient air in through first end 44.

Figure 2:
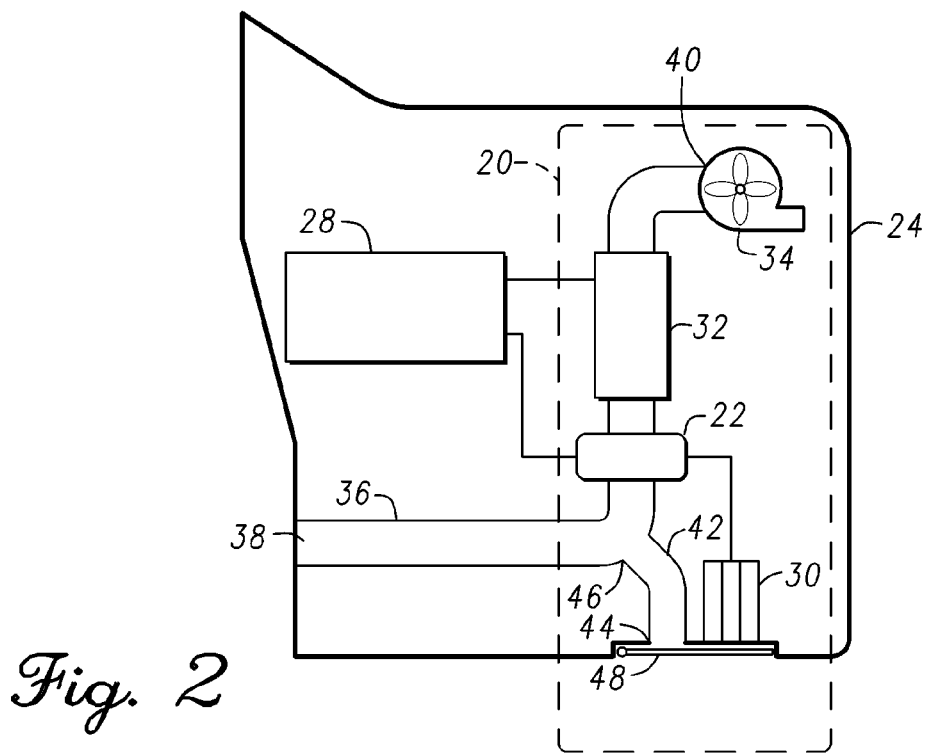
FIG. 2 is a schematic view illustrating the cooling arrangement of FIG. 1 in a second configuration.

FIG. 2 is a schematic view illustrating cooling arrangement 20 with cover member 48 in a closed position. With continuing reference to FIGS. 1-2, port 30 has been disengaged from electric charger 26 and both port 30 and first end 44 of duct 42 are covered by cover member 48. This illustrated configuration would be employed anytime vehicle 24 is being driven. Cover member 48 effectively closes off duct 42. Accordingly, when auxiliary power module blower 34 is being operated to cool auxiliary power module 32, air from the passenger compartment is drawn into first end 38 and routed over/through auxiliary power module 32 in the conventional manner. Cover member 48, when in the closed position, helps to ensure that air passing through duct 36 is not drawn into duct 42 and pulled out of vehicle 24 as a result of aerodynamic forces encountered by vehicle 24 as it is being driven.

Figure 3:
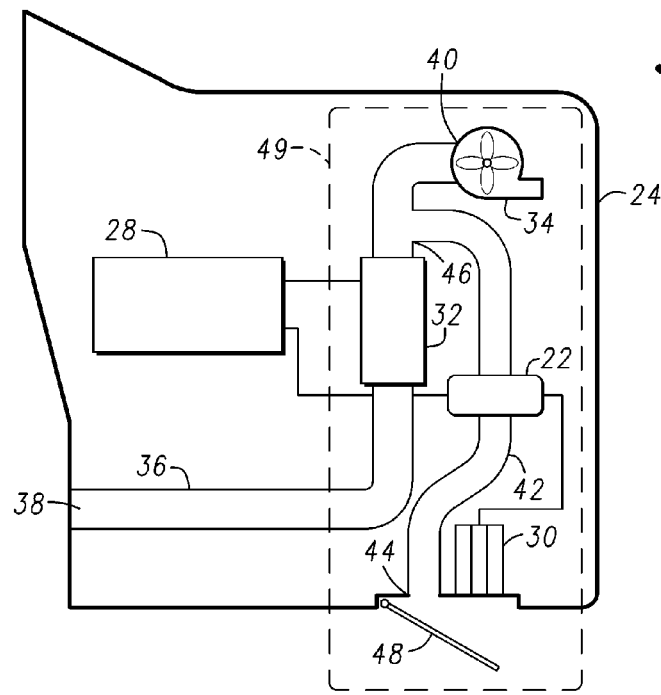
FIG. 3 is a schematic view illustrating another embodiment of a cooling arrangement.

FIG. 3 is a schematic view illustrating an alternate embodiment 49 of cooling arrangement 20. With continuing reference to FIGS. 1-3, alternate embodiment 49 positions onboard charging module 22 and auxiliary power module 32 in a parallel arrangement. Duct 42 ties into duct 36 downstream of both onboard charging module 22 and auxiliary power module 32. Thus, whereas cooling arrangement 20 aligned both components in a single path, alternate embodiment 49 essentially creates two alternate paths. As before, auxiliary power module blower 34 will be actuated while vehicle 24 is turned off, when electric charger 26 is inserted into port 30, or when it is otherwise detected that rechargeable energy storage system 28 is receiving direct current electric power from onboard charging module 22.

Figure 4:
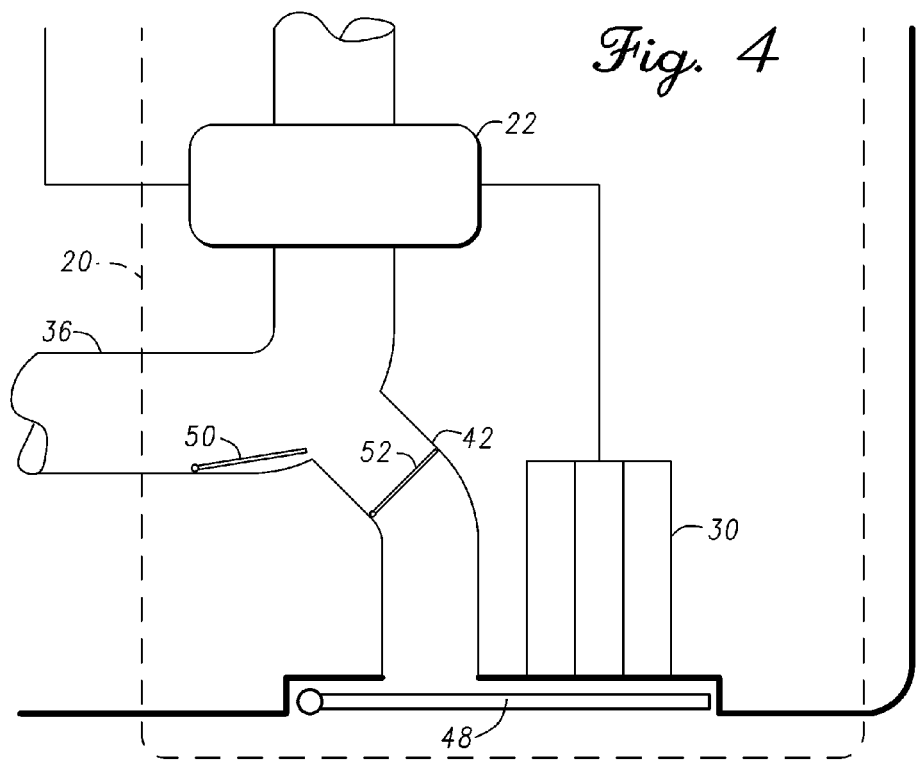
FIG. 4 is an expanded schematic view illustrating a portion of the cooling arrangement of FIG. 1 with a plurality of gates arranged in a first configuration.

FIG. 4 is an expanded schematic view illustrating a portion of cooling arrangement 20. In this expanded view, a first gate 50 is illustrated mounted within duct 36 and a second gate 52 is illustrated mounted within duct 42. First gate 50 is configured to move between an open position and a closed position and in FIG. 4, is illustrated in the open position. While first gate 50 is in the open position, airflow may move through duct 36 in a relatively unimpeded fashion. Second gate 52 is also configured to move between an open position and a closed position and in FIG. 4, is illustrated in the closed position. While second gate 52 is in the close position, airflow through duct 42 is substantially inhibited and thus cooperates with cover member 48 to prevent the diversion of airflow passing through duct 36 from exiting vehicle 24 through duct 42.

The configuration illustrated in FIG. 4 (first gate 50 open and second gate 52 closed) may be implemented anytime an appropriate triggering event occurs. With continuing reference to FIGS. 1-2 and 4, the triggering event may be any of a number of events including, but not limited to, the closing of cover member 48, the removal of electric charger 26 from port 30, the turning on of vehicle 24, and/or the commencement of a cooling cycle for auxiliary power module 32 during operation of vehicle 24. Suitable monitors may be positioned at various locations around vehicle 24 to detect a triggering event and a vehicle central processing unit may send commands to first gate 50 and second gate 52 to move to the open and closed positions, respectively when such triggering event is detected.

Figure 5:
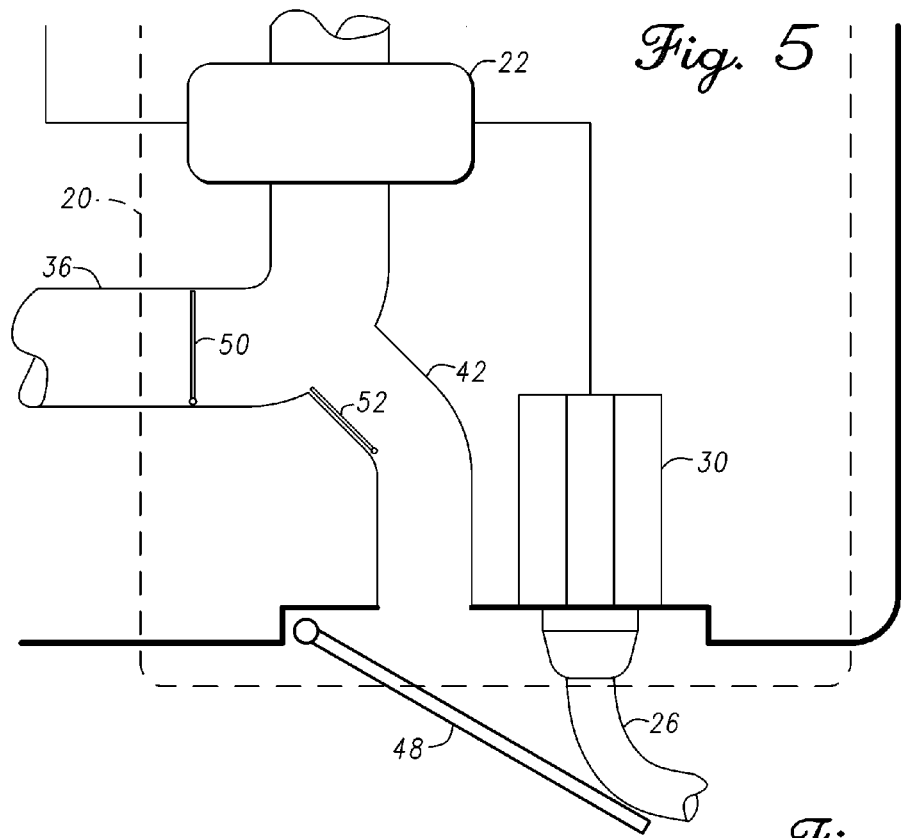
FIG. 5 is an expanded schematic view illustrating the cooling arrangement of FIG. 4 with the plurality of gates arranged in a second configuration.

FIG. 5 is an expanded schematic view illustrating the expanded portion of cooling arrangement 20 of FIG. 4 in a configuration where first gate 50 is in the closed position and second gate 52 is in the open position. With continuing reference to FIGS. 1-2 and 4-5, in FIG. 5, cover member 48 has been opened, electric charger 26 is engaged with port 30, and rechargeable energy storage system 28 is being recharged. At this time, vehicle 24 is switched off and auxiliary power module blower 34 is being operated to cool onboard charging module 22. With first gate 50 in the closed position and second gate 52 in the open position, airflow from the passenger compartment of vehicle 24 is substantially inhibited and the flow of ambient air from outside vehicle 24 is substantially unobstructed. This may be desirable in instances where the temperature of air inside the passenger compartment is higher than the temperature of ambient air outside of vehicle 24. In this manner, first gate 50 and second gate 52 may be used to optimize the cooling of onboard charging module 22 through the use of ambient air.

While first gate 50 and second gate 52 have been illustrated in FIGS. 4 and 5 as being implemented in cooling arrangement 20 which employs a series configuration, first gate 50 and second gate 52 could also be implemented with alternate embodiment 49 which employs a parallel configuration. Furthermore, it should be understood that in other embodiments, a greater or lesser number of gates may be implemented.

Figure 6:
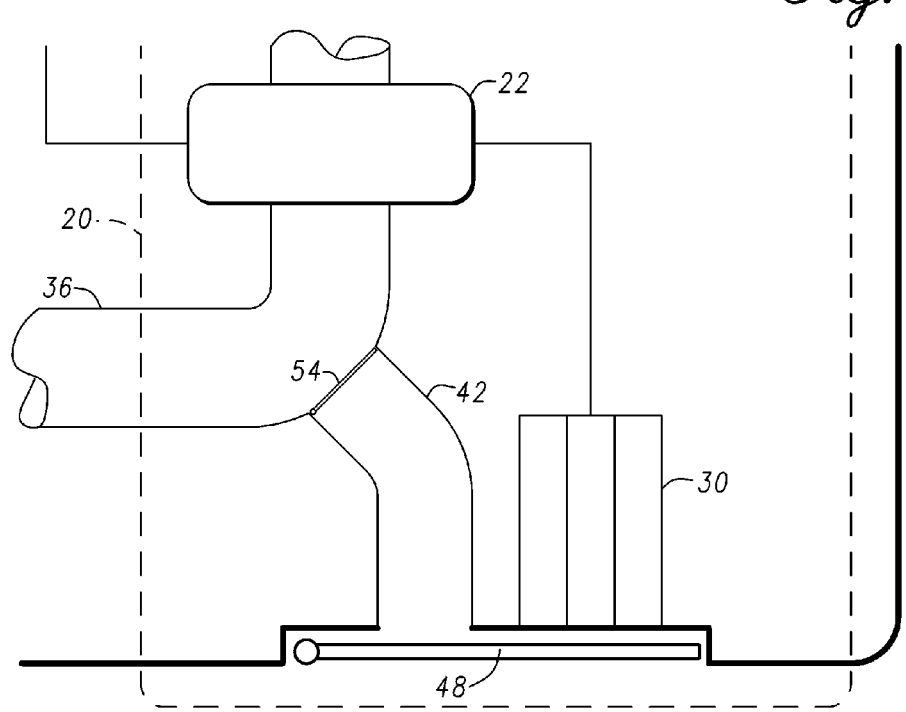
FIG. 6 is an expanded schematic view illustrating a portion of the cooling arrangement of FIG. 1 with a single gate arranged in a first configuration.

FIG. 6 is an expanded schematic view illustrating a portion of an embodiment of cooling arrangement 20 that utilizes only a single gate instead of the two gates illustrated in FIGS. 4-5. A gate 54 is positioned at an intersection of duct 36 and duct 42 and is configured to move between a first position and a second position. FIG. 6 illustrates gate 54 in the first position. While in the first position, gate 54 obstructs the flow of air through duct 42 and thus cooperates with cover member 48 to inhibit the diversion of airflow from duct 36 into duct 42.

Figure 7:
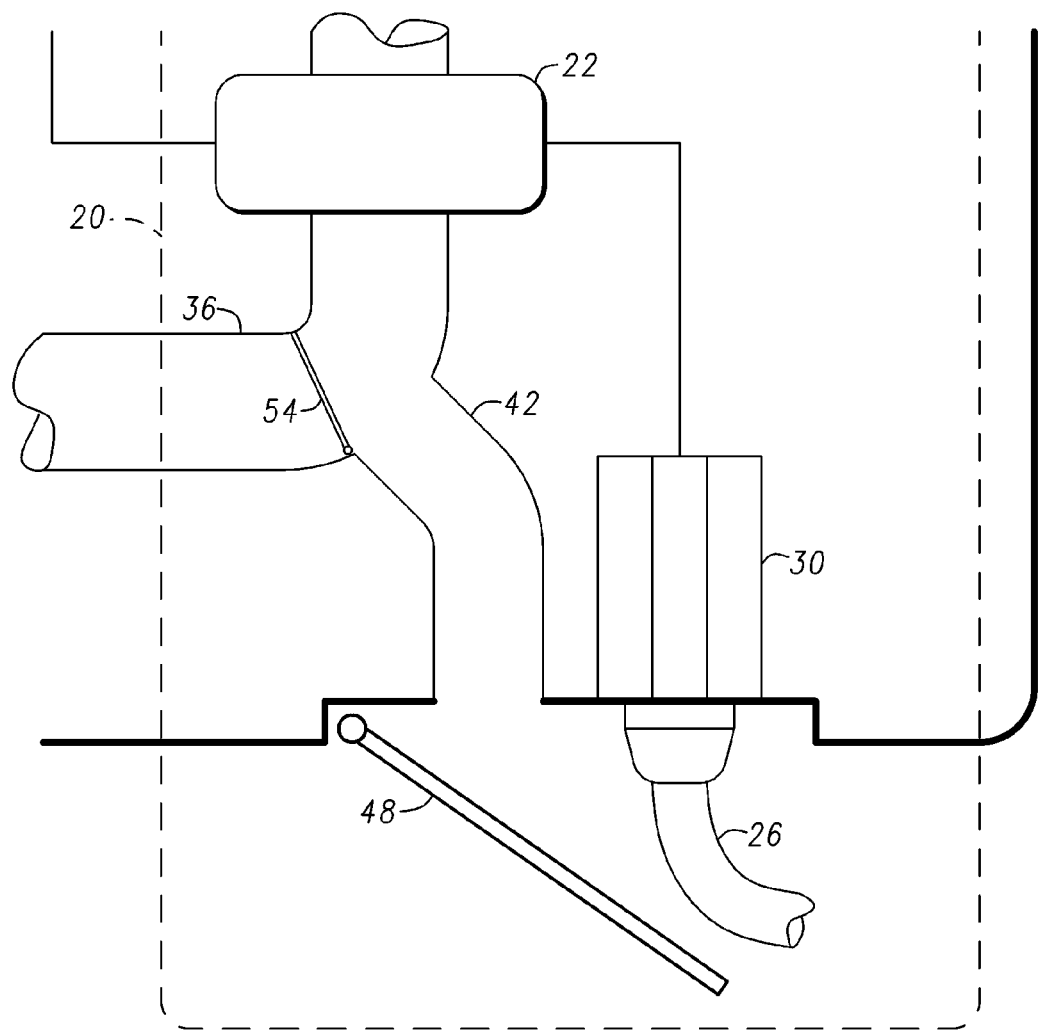
FIG. 7 is an expanded schematic view illustrating the cooling arrangement of FIG. 6 with the single gate arranged in a second configuration.

FIG. 7 is an expanded schematic view illustrating the portion of cooling arrangement 20 illustrated in FIG. 6 with gate 54 disposed in the second position. While in the second position, gate 54 obstructs the flow of air from the passenger compartment through duct 36 and thus enhances the ability of cooling arrangement 20 draw in ambient air from outside of vehicle 24 to cool onboard charging module 22.

With continuing reference to FIGS. 6 and 7, gate 54 will be in the first position while vehicle 24 is being driven and will be in the second position while vehicle 24 is being recharged. A vehicle central processing unit or other processor onboard vehicle 24 may be configured to receive inputs from detectors that are positioned on vehicle 24 and which provide information indicative of the charging and/or operational status of vehicle 24. Such processor may further be configured to control the movement of gate 54 between the first and second positions in response to the inputs received from such detectors. While gate 54 has been illustrated in FIGS. 6 and 7 as being implemented in cooling arrangement 20, which employs a series configuration, gate 54 could also be implemented with alternate embodiment 49 (see FIG. 3) which employs a parallel configuration.

Figure 8:
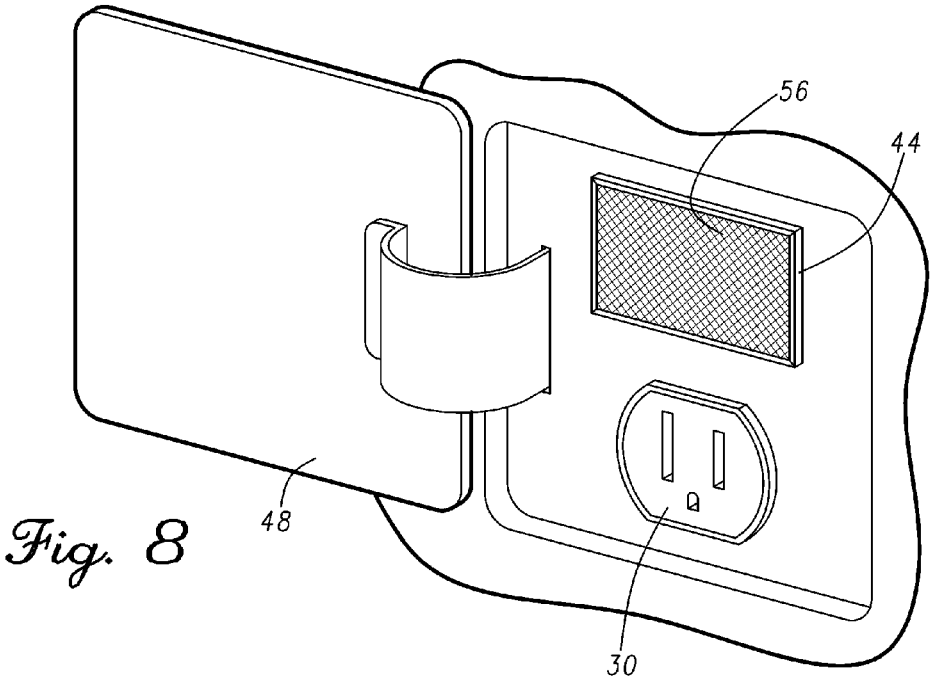
FIG. 8 is a perspective view illustrating an access panel and a cover member associated with the cooling arrangement disclosed herein.

FIG. 8 is a perspective view illustrating port 30, first end 44 of duct 42, and cover member 48 member. Port 30 may be configured to receive a standard electrical plug to permit recharging of the vehicle's high-voltage battery. In the illustrated configuration, first end 44 is positioned above the port 30. This may be desirable to prevent any debris which may collect in the vicinity of port 30 from falling into or from being drawn into first end 44. Additionally, a filter 56 is illustrated in position over first end 44 to prevent dust, smoke, particulate matter, and debris from being drawn into first end 44. In some embodiments, filter 56 may be replaceable, and/or removable and washable.

Figure 9:
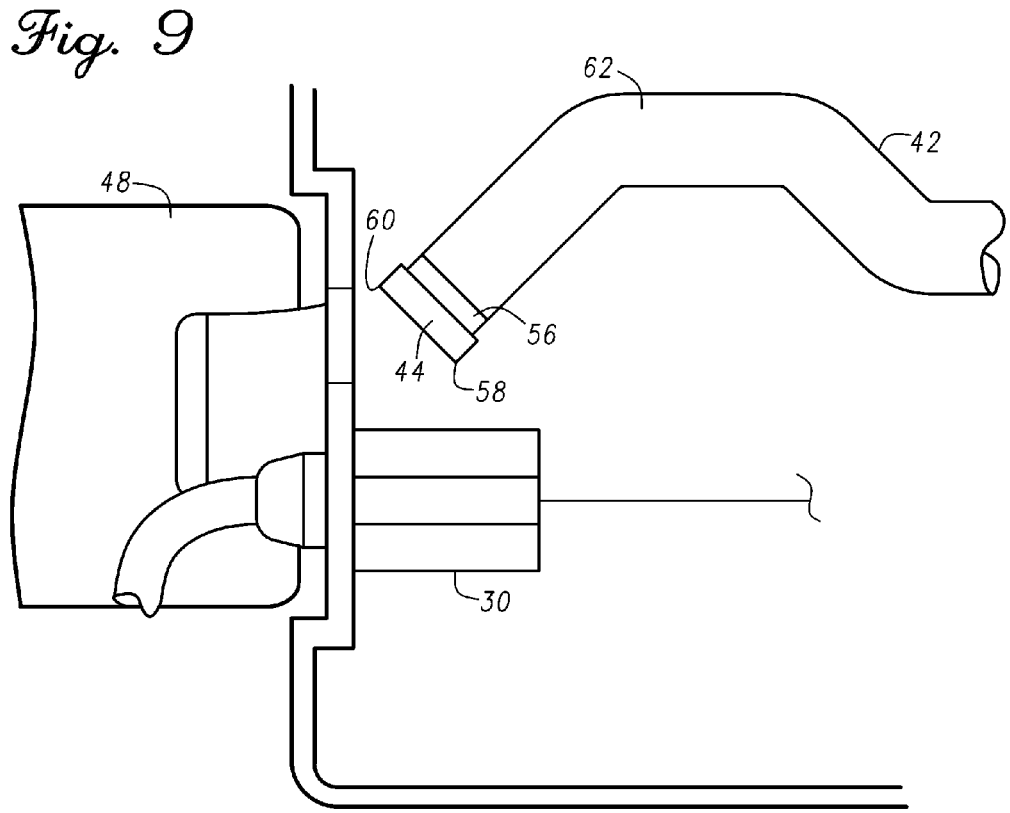
FIG. 9 is a schematic side view illustrating an end portion of a duct of the cooling arrangement disclosed herein.

FIG. 9 is a schematic side view illustrating first end 44 of duct 42 and of port 30. As illustrated, first end 44 includes a lower portion 58 and an upper portion 60. Lower portion 58 has been positioned inboard of upper portion 62 to cant first end 44 at a downward facing angle. Such an orientation will further inhibit dust, smoke, particulate matter, and debris from falling into or otherwise entering duct 42 through first end 44. Additionally, duct 42 includes a trap 62. Trap 62 comprises an elevated portion of duct 42 and provides a further impediment to dust, smoke, particulate matter and debris from traveling through duct 42.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A cooling arrangement for an extended range electric vehicle having an auxiliary power module, a first duct, and an auxiliary power module blower configured to deliver air through the first duct to the auxiliary power module when the auxiliary power module blower is operated, the cooling arrangement comprising:
   the auxiliary power module blower;
   an onboard charging module;
   a charging port coupled to the onboard charging module, the charging port being accessible from a position external to the extended range electric vehicle; and
   a second duct having a first end positioned proximate the charging port and a second end in fluid communication with the first duct, the second end being directly fluidly coupled with the first duct at a location upstream of the auxiliary power module blower, and the second duct configured to deliver ambient air from outside of the extended range electric vehicle to the onboard charging module when the auxiliary power module blower is operated while the extended range electric vehicle is off,
   wherein the auxiliary power module blower is configured to operate while the extended range electric vehicle is off and while the charging port is accessed, whereby the auxiliary power module blower delivers air from outside the extended range electric vehicle to the onboard charging module,
   wherein the auxiliary power module blower unilaterally cools both the auxiliary power module and the onboard charging module, and
   wherein the auxiliary power module blower, the onboard charging module, the charging port, and the second duct are mounted to the extended range electric vehicle.

2. The cooling arrangement of claim 1, wherein the auxiliary power module blower is configured to operate while the charging port is coupled to an electric power source.

3. The cooling arrangement of claim 2, wherein the auxiliary power module blower is configured to operate when a charger is plugged into the charging port and is delivering power to the onboard charging module.

4. The cooling arrangement of claim 1, further comprising a cover member disposed proximate the charging port and configured to move between an open position wherein the charging port is exposed and a closed position wherein the charging port is covered, and wherein the first end of the second duct is exposed when the cover member is in the open position and covered when the cover member is in the closed position.

5. The cooling arrangement of claim 1, wherein the first end of the second duct is positioned above the charging port.

6. The cooling arrangement of claim 1, wherein the first end of the second duct is tilted such that a lower portion of the first end is positioned inboard of an upper portion of the first end.

7. The cooling arrangement of claim 1, further comprising a filter covering the first end of the second duct.

8. The cooling arrangement of claim 1, further comprising a gate positioned in the first duct and configured to move between a first position and a second position, the gate obstructing airflow through the first duct when the gate is in the first position and permitting airflow through the first duct when the gate is in the second position, the gate further configured to move to the first position when the second duct delivers air from outside of the extended range electric vehicle to the the onboard charging module.

9. The cooling arrangement of claim 1, further comprising a gate positioned in the second duct and configured to move between a first position and a second position, the gate obstructing airflow through the second duct when the gate is in the first position and permitting airflow through the first duct when the gate is in the second position, the gate further configured to move to the first position when the first duct delivers air to the auxiliary power module.

10. The cooling arrangement of claim 1, further comprising a gate positioned at an intersection of the first duct and the second duct and configured to move between a first position and a second position, the gate obstructing airflow through the first duct when the gate is in the first position, and the gate obstructing airflow through the second duct when the gate is in the second position, the gate being further configured to move to the first position when the second duct delivers air from outside of the extended range electric vehicle to the the onboard charging module and to move to the second position when the first duct delivers air to the auxiliary power module.

11. The cooling arrangement of claim 1, wherein the second duct is configured to include a trap.

12. A cooling arrangement for an extended range electric vehicle having an auxiliary power module, a first duct, and an auxiliary power module blower configured to deliver air through the first duct to the auxiliary power module when the auxiliary power module blower is operated, the cooling arrangement comprising:
- the auxiliary power module blower;
- an onboard charging module;
- a charging port coupled to the onboard charging module, the charging port being accessible from a position external to the extended range electric vehicle; and
- a second duct having a first end positioned proximate the charging port and a second end in fluid communication with the first duct, the second end being directly fluidly coupled with the first duct at a location upstream of the auxiliary power module blower, and the second duct configured to deliver ambient air from outside of the extended range electric vehicle to the onboard charging module when the auxiliary power module blower is operated while the extended range electric vehicle is off,
- wherein the auxiliary power module blower and the onboard charging module are fluidly coupled to one another in a series arrangement, and wherein the auxiliary power module blower is configured to operate while the extended range electric vehicle is off and while the charging port is accessed, whereby the auxiliary power module blower delivers air from outside the extended range electric vehicle to the onboard charging module,
- wherein the auxiliary power module blower unilaterally cools both the auxiliary power module and the onboard charging module, and
- wherein the auxiliary power module blower, the onboard charging module, the charging port, and the second duct are mounted to the extended range electric vehicle.

13. The cooling arrangement of claim 12, wherein the auxiliary power module blower is configured to operate when a charger is plugged into the charging port and is delivering power to the onboard charging module.

14. The cooling arrangement of claim 12, further comprising a gate positioned at an intersection of the first duct and the second duct and configured to move between a first position and a second position, the gate obstructing airflow through the first duct when the gate is in the first position, and the gate obstructing airflow through the second duct when the gate is in the second position, the gate being further configured to move to the first position when the second duct delivers air from outside of the extended range electric vehicle to the the onboard charging module and to move to the second position with the first duct delivers air to the auxiliary power module.

15. A cooling arrangement for an extended range electric vehicle having an auxiliary power module, a first duct, and an auxiliary power module blower configured to deliver air through the first duct to the auxiliary power module when the auxiliary power module blower is operated, the cooling arrangement comprising:
- the auxiliary power module blower;
- an onboard charging module;
- a charging port coupled to the onboard charging module, the charging port being accessible from a position external to the extended range electric vehicle; and
- a second duct having a first end positioned proximate the charging port and a second end in fluid communication with the first duct, the second end being directly fluidly coupled with the first duct at a location upstream of the auxiliary power module blower, and the second duct configured to deliver ambient air from outside of the extended range electric vehicle to the onboard charging module when the auxiliary power module blower is operated while the extended range electric vehicle is off,
- wherein the auxiliary power module blower and the onboard charging module are fluidly coupled to one another in a parallel arrangement, and wherein the auxiliary power module blower is configured to operate while the extended range electric vehicle is off and while the charging port is accessed, whereby the auxiliary power module blower delivers air from outside the extended range electric vehicle to the onboard charging module,
- wherein the auxiliary power module blower unilaterally cools both the auxiliary power module and the onboard charging module, and
- wherein the auxiliary power module blower, the onboard charging module, the charging port, and the second duct are mounted to the extended range electric vehicle.

16. The cooling arrangement of claim 15, wherein the auxiliary power module blower is configured to operate when a charger is plugged into the charging port and is delivering power to the onboard charging module.

17. The cooling arrangement of claim 15, further comprising a gate positioned at an intersection of the first duct and the second duct and configured to move between a first position and a second position, the gate obstructing airflow through the first duct when the gate is in the first position, and the gate obstructing airflow through the second duct when the gate is in the second position, the gate being further configured to move to the first position when the second duct delivers air from outside of the extended range electric vehicle to the the onboard charging module and to move to the second position when the first duct delivers air to the auxiliary power module.

* * * * *